United States Patent
Kim et al.

(10) Patent No.: US 10,624,078 B2
(45) Date of Patent: Apr. 14, 2020

(54) NETWORK COOPERATIVE COMMUNICATION METHOD FOR TRAFFIC DISTRIBUTION IN WIRELESS COMMUNICATION SYSTEM, AND APPARATUS THEREFOR

(71) Applicant: LG ELECTRONICS INC., Seoul (KR)

(72) Inventors: Hyungtae Kim, Seoul (KR); Myoungseob Kim, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/515,502

(22) PCT Filed: Dec. 21, 2015

(86) PCT No.: PCT/KR2015/014014
§ 371 (c)(1),
(2) Date: Mar. 29, 2017

(87) PCT Pub. No.: WO2016/105046
PCT Pub. Date: Jun. 30, 2016

(65) Prior Publication Data
US 2017/0215175 A1      Jul. 27, 2017

Related U.S. Application Data

(60) Provisional application No. 62/095,052, filed on Dec. 21, 2014.

(51) Int. Cl.
*H04W 72/04*      (2009.01)
*H04B 7/026*      (2017.01)
(Continued)

(52) U.S. Cl.
CPC .......... *H04W 72/042* (2013.01); *H04B 7/024* (2013.01); *H04B 7/026* (2013.01);
(Continued)

(58) Field of Classification Search
CPC ........... H04W 72/042; H04W 28/0215; H04W 72/048; H04W 88/04; H04L 5/0051;
(Continued)

(56) References Cited

U.S. PATENT DOCUMENTS

2013/0322277 A1    12/2013  Vanganuru et al.
2013/0322413 A1    12/2013  Pelletier et al.
(Continued)

FOREIGN PATENT DOCUMENTS

KR       1020130121052       11/2013

OTHER PUBLICATIONS

PCT International Application No. PCT/KR2015/014014, Written Opinion of the International Searching Authority dated Apr. 4, 2016, 18 pages.
(Continued)

*Primary Examiner* — Moo Jeong
(74) *Attorney, Agent, or Firm* — Lee, Hong, Degerman, Kang & Waimey (57) ABSTRACT

The present application discloses a method of transmitting, by a relay terminal of a second cell, downlink data for a receiving cell of a first cell in a wireless communication system. Specifically, the method comprises the steps of: receiving downlink data for the receiving terminal of the first cell from the second cell; transmitting control information for the downlink data to the receiving terminal; and transmitting the downlink data to the receiving terminal on the basis of the control information, wherein the downlink data is delivered from the first cell to the second cell via a backhaul link. In particular, the control information is char- (Continued)

acterized by comprising: data grant which indicates a plurality of resource areas for communication between the relay terminal and the receiving terminal; and a request message for channel state information between the relay terminal and the receiving terminal.

3 Claims, 9 Drawing Sheets

(51) Int. Cl.
*H04B 7/024* (2017.01)
*H04L 5/00* (2006.01)
*H04W 28/02* (2009.01)
*H04B 7/0417* (2017.01)
*H04W 88/04* (2009.01)

(52) U.S. Cl.
CPC .......... *H04L 5/0032* (2013.01); *H04L 5/0051* (2013.01); *H04W 28/0215* (2013.01); *H04W 72/048* (2013.01); *H04B 7/0417* (2013.01); *H04L 5/0035* (2013.01); *H04W 88/04* (2013.01)

(58) Field of Classification Search
CPC ..... H04L 5/0032; H04L 5/0035; H04B 7/026; H04B 7/024; H04B 7/0417
See application file for complete search history.

(56) References Cited

U.S. PATENT DOCUMENTS

| | | | |
|---|---|---|---|
| 2014/0079218 A1 | 3/2014 | Cheng et al. | |
| 2015/0078279 A1* | 3/2015 | Ko | H04W 76/14 370/329 |
| 2017/0034866 A1* | 2/2017 | Wager | H04W 76/025 |
| 2017/0289957 A1* | 10/2017 | Zhang | H04W 68/02 |

OTHER PUBLICATIONS

Qualcomm Incorporated, "TP for D2D for TS 36.300", R1-143678, 3GPP TSG RAN WG1 Meeting #78, 19 pages.

* cited by examiner

(A) CONTROL-PLANE PROTOCOL STACK (B) USER-PLANE PROTOCOL STACK

NETWORK COOPERATIVE COMMUNICATION METHOD FOR TRAFFIC DISTRIBUTION IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/014014, filed on Dec. 21, 2015, which claims the benefit of U.S. Provisional Application No. 62/095,052, filed on Dec. 21, 2014, the contents of which are all hereby incorporated by reference herein in their entirety.

TECHNICAL FIELD

The present invention relates to a wireless communication system, and more particularly, to a network cooperative communication method for traffic distribution in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

Figure 1:
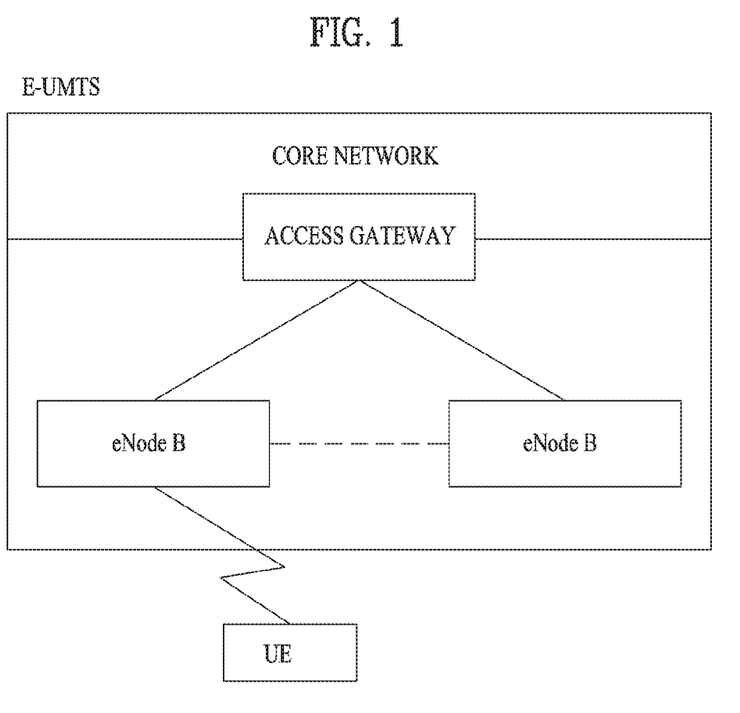
FIG. 1 illustrates a configuration of an Evolved Universal Mobile Telecommunications System (E-UMTS) network as an example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the above discussion, a network cooperative communication method for traffic distribution in a wireless communication system and apparatus therefor are proposed.

Technical Solutions

In an aspect of the present invention, provided herein is a method of transmitting downlink data for a reception user equipment (UE) in a first cell in a wireless communication system, the method performed by a relay UE in a second cell and including: receiving the downlink data for the reception UE of the first cell from the second cell; transmitting control information for the downlink data to the reception UE; and transmitting the downlink data to the reception UE based on the control information, wherein the downlink data may be transferred from the first cell to the second cell through a backhaul link.

In particular, the control information may include a data grant indicating a plurality of resource regions for communication between the relay UE and the reception UE and a message requesting channel state information between the relay UE and the reception UE.

Preferably, the transmission method may further include transmitting a sounding reference signal to the reception UE, wherein the channel state information between the relay UE and the reception UE may be calculated by the reception UE based on the sounding reference signal. In addition, the transmission method may further include receiving, from the reception UE, the channel state information between the relay UE and the reception UE through a first resource region among the plurality of the resource regions.

More preferably, transmitting the downlink data may include: precoding the downlink data based on the channel state information between the relay UE and the reception UE; and transmitting the precoded downlink data to the reception UE.

Additionally, the transmission method may further include receiving a response signal in response to the downlink data from the reception UE. Alternatively, a response signal in response to the downlink data may be reported from the reception UE to the first cell.

In another aspect of the present invention, provided herein is a method of receiving downlink data from a relay user equipment (UE) in a second cell in a wireless communication system, the method performed by a UE in a first cell and including: receiving control information for the downlink data from the relay UE; and receiving the downlink data from the relay UE based on the control information, wherein the relay UE may receive the downlink data for the UE of the first cell from the second cell, and wherein the downlink data may be transferred from the first cell to the second cell through a backhaul link.

In particular, the control information may include a data grant indicating a plurality of resource regions for communication between the relay UE and the UE and a message requesting channel state information between the relay UE and the UE.

Preferably, the reception method may further include receiving a sounding reference signal from the relay UE; and calculating the channel state information between the relay UE and the UE based on the sounding reference signal. In this case, the reception method may further include transmitting, to the relay UE, the channel state information through a first resource region among the plurality of the resource regions. More preferably, the downlink data may be precoded by the relay UE based on the channel state information.

Additionally, the reception method may further include transmitting a response signal in response to the downlink data to the relay UE or transmitting a response signal in response to the downlink data to the first cell.

Advantages Effects

According to embodiments of the present invention, a UE can efficiently transmit and receive signals through network cooperation for traffic distribution.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 2:
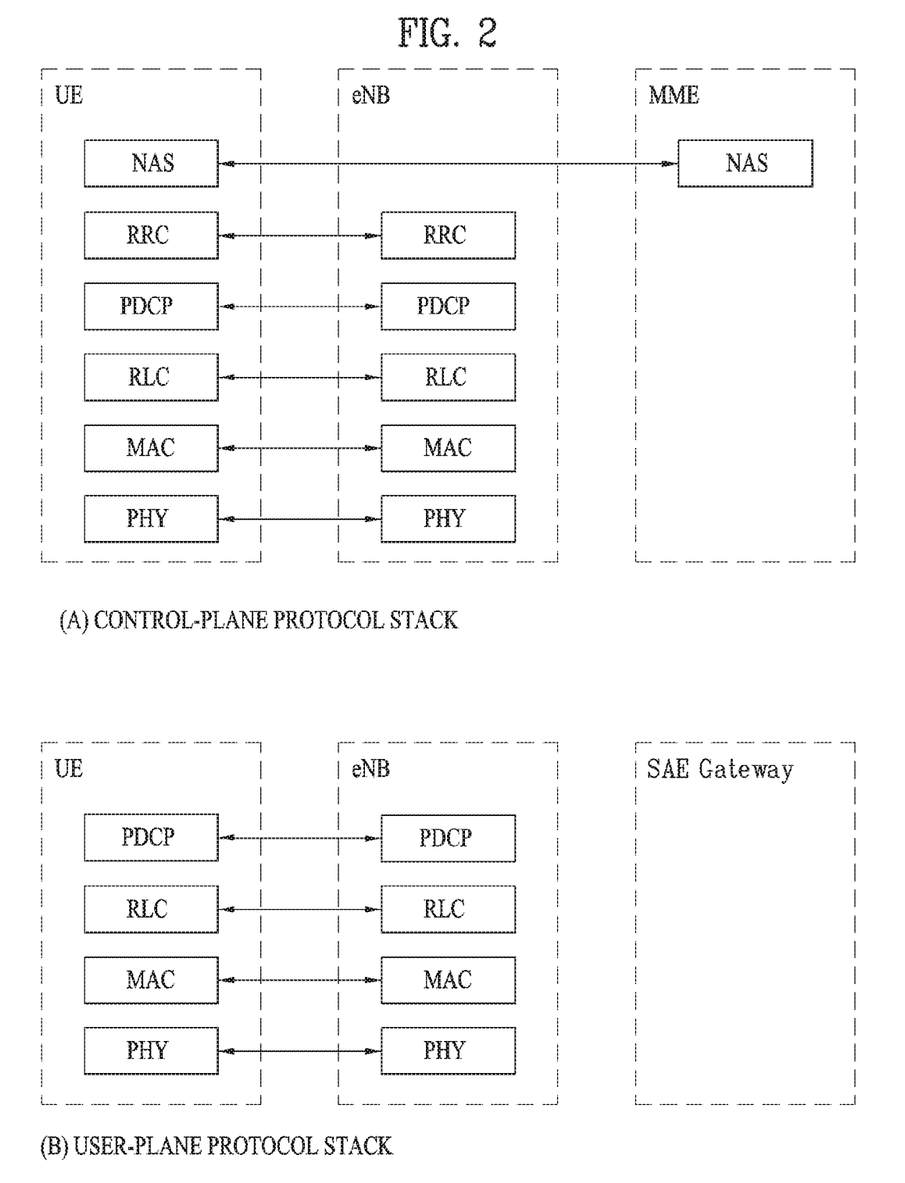
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
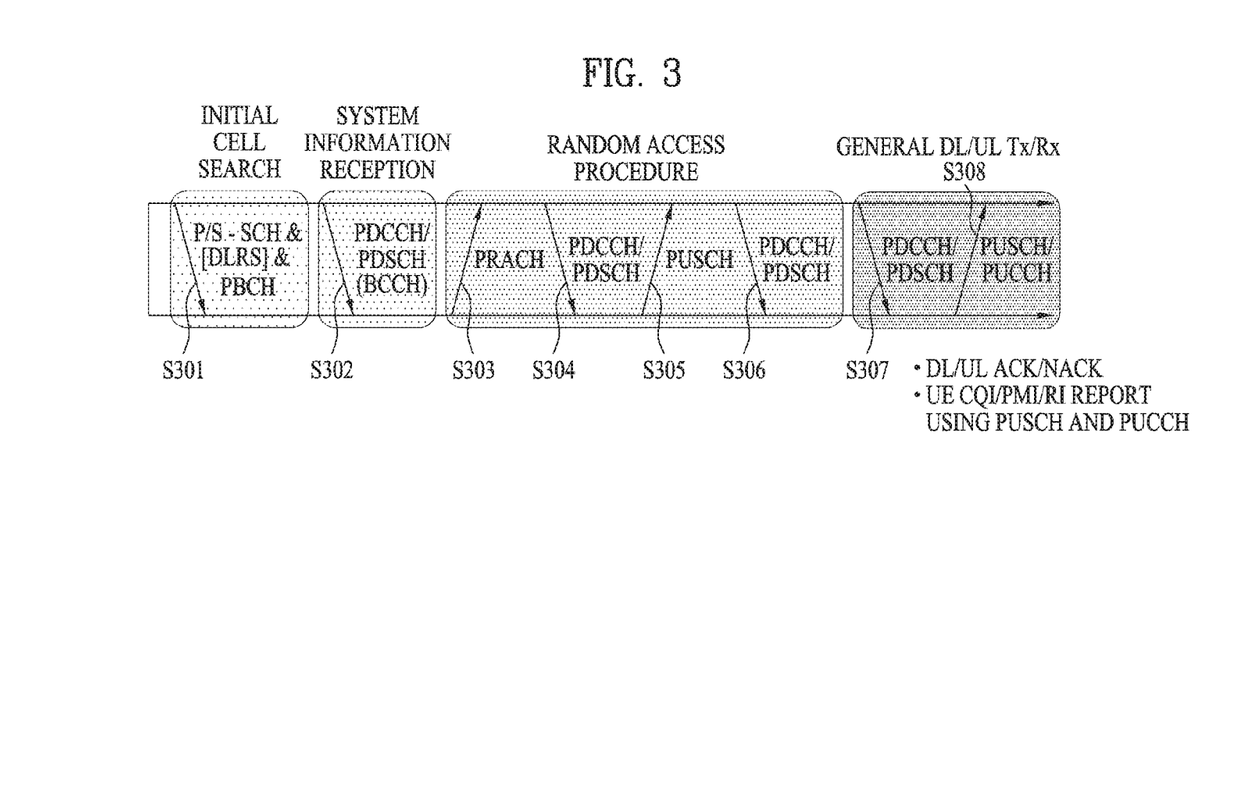
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DLRS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
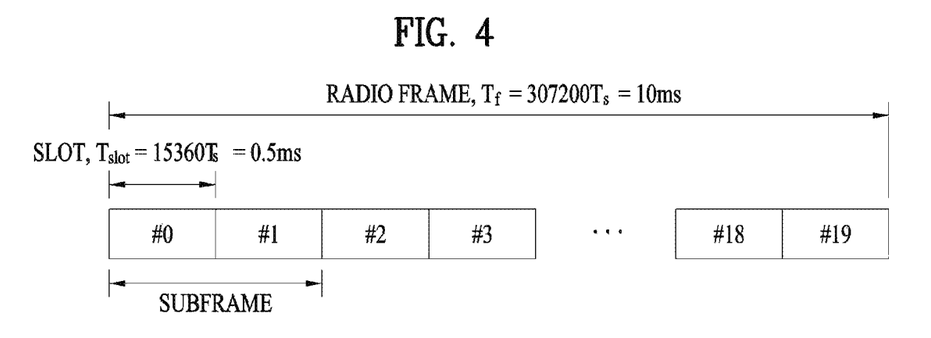
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1ms long and further divided into two slots. Each time slot is 0.5 ms (15360×$T_s$) long. Herein, $T_s$ represents a sampling time and $T_s=1/(15 \text{ kHz}\times 2048)=3.2552\times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
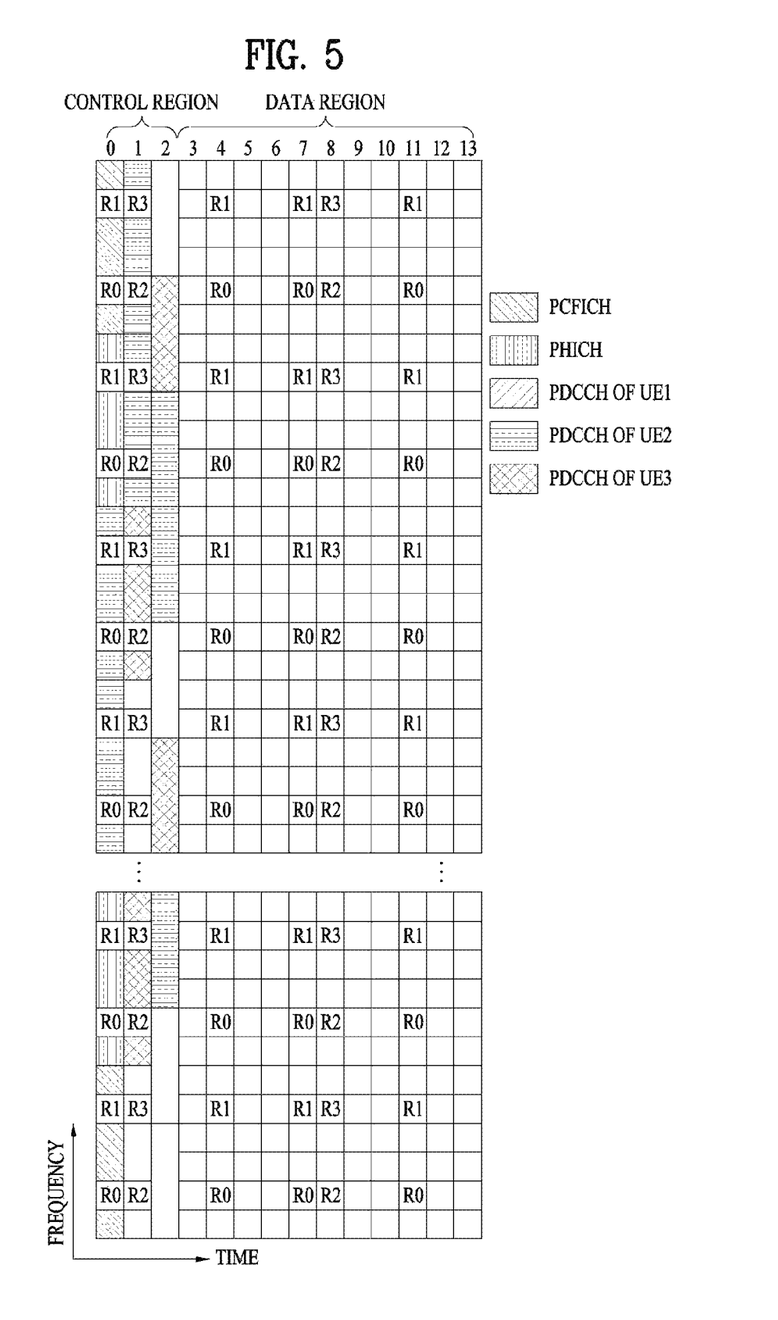
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4. Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
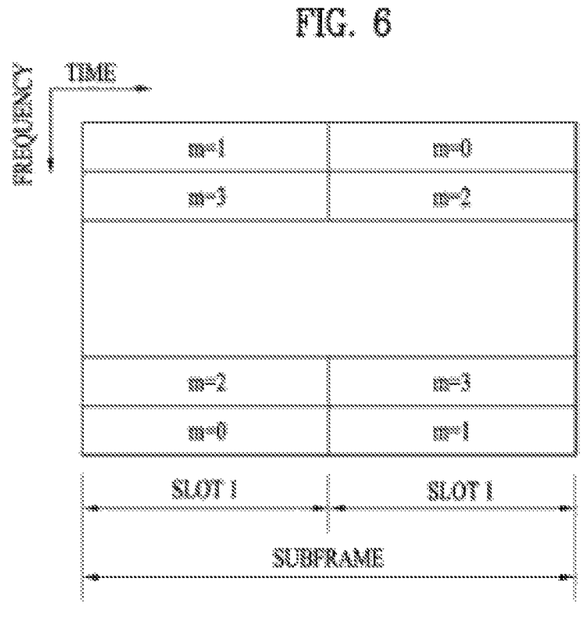
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Meanwhile, it is expected that a LTE-A system, which is a standard of a next generation mobile communication system, will support a CoMP (coordinated multi point) transmission scheme, which is not supported by the conventional standard, to enhance a data transmission rate. In this case, the CoMP transmission scheme means a transmission scheme where two or more eNBs or cells cooperatively communicate with a UE located in a radio shadow area to improve communication performance between the UE and the eNB (cell or sector).

The CoMP transmission scheme can be classified into a CoMP joint processing (CoMP-JP) scheme where cooperative MIMO is performed through data sharing and a CoMP-coordinated scheduling/beamforming (CoMP-CS/CB) scheme.

In DL CoMP-JP, a UE may instantaneously receive data simultaneously from eNBs that perform CoMP transmission and then combine the received signals, thereby increasing reception performance (joint transmission (JT)). In addition, one of the eNBs participating in the CoMP transmission may transmit data to the UE at a specific time point (dynamic point selection (DPS)). In contrast, in DL CoMP-CS/CB, a UE may receive data instantaneously from one eNB, that is, a serving eNB through beamforming.

In UL CoMP-JP, eNBs may receive a PUSCH signal from a UE at the same time (joint reception (JR)). In contrast, in UL CoMP-CS/CB, only one eNB receives a PUSCH from a UE. In this case, cooperative cells (or eNBs) may make a decision as to whether to use CoMP-CS/CB.

If one cell (e.g., cell 2) has a large amount of DL data traffic in a cellular communication system, a number of users may contend with each other for DL services due to limited frequency time resources. On the contrary, if a neighboring cell (e.g., cell 1) has a very small amount of DL data traffic, frequency time resources may be rarely used and thus, the neighboring cell may have significantly low resource efficiency.

According to the LTE system, a bias can be added to a reference signal received power (RSRP) value and a UE can be connected to a cell with the lowest RSRP to solve such inefficient resource use. In addition, an almost blank subframe (ABS) has been introduced in the LTE system to cancel strong inter-cell interference that occurs when the bias is added. Here, the ABS means a subframe in which a signal, e.g., data traffic, is barely transmitted. In a subframe designated as the ABS, only information such as CRS (cell-specific reference signal) and PSS/SSS/PBCH/SIB1/Paging/PRS (positioning RS) can be transmitted. Although such a scheme is advantageous in terms of traffic offloading, a penalty is imposed to the cell 2 in that the cell 2 needs to reduce transmit power or perform muting on the ABS.

Although the present invention proposes a traffic offloading scheme, the invention also propose the use of a relay UE to eliminate the penalty imposed to the cell 2 due to the ABS and that the corresponding relay UE uses UL resources. Therefore, even if the cell 2 provides a DL service, a UE in the cell 2, which receives data from the cell 1, may not be affected by the corresponding DL interference. Although eNB 1 can directly transmit data to the UE in the cell 2 using UL resources without the relay UE, this may be restricted by the frequency regulations defined in many countries.

Although the present invention is described on the assumption that two cells are present in a homogeneous network, the invention can be applied to various environments including the homogeneous network environment.

Figure 7:
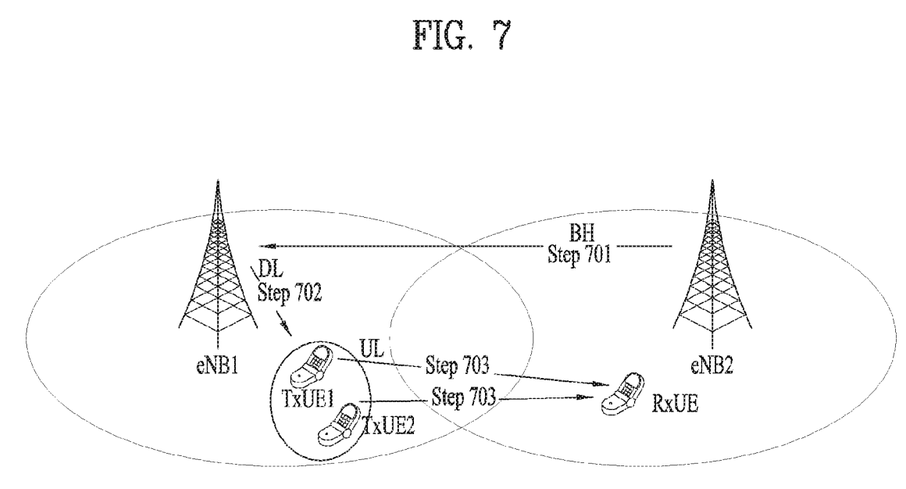
FIG. 7 illustrates a signal transmission method for traffic distribution according to an embodiment of the present invention.

FIG. 7 illustrates a signal transmission method for traffic distribution according to an embodiment of the present invention. In particular, assume that cell 2 (eNB 2) has a large amount of DL traffic, whereas cell 1 (eNB 1) has a small amount of DL traffic.

Referring to FIG. 7, the cell2 transmits data, which will be transmitted to a UE in the cell 2, i.e., an RxUE, to the cell 1 through a backhaul link in step 701. Thereafter, in steps 702 and 703, the cell 1 forwards the data received in the step

701 to the RxUE on behalf of the cell 2. In detail, UEs in the cell 1, that is, TxUE1 and TxUE2 receive the data from the eNB 1 and then transmit the received data to the RxUE in the cell 2 as a relay UE.

In this case, if an ABS is not configured in the cell 2, the cell 2 may transmit its DL data in all DL subframes. In addition, a relay UE is preferred to receive the data using a DL subframe and then forward the received data to the RxUE corresponding to a destination UE using a UL subframe in order to minimize interference caused by DL transmission from the cell 2 to the RxUE.

Hereinafter, traffic distribution will be described in detail according to a backhaul link state between two eNBs.

First, a description will be given of a case in which a backhaul link is ideal.

Figure 8:
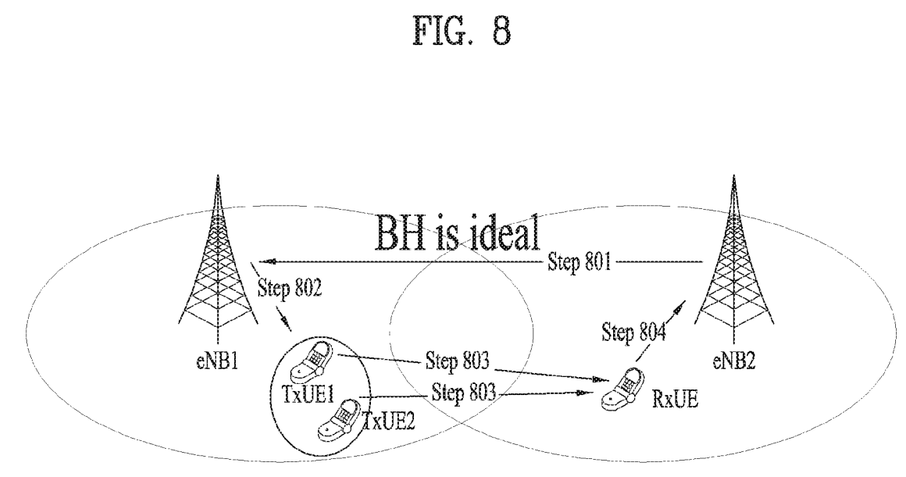
FIG. 8 illustrates a signal transmission method for traffic distribution when a backhaul link between two eNBs is ideal according to an embodiment of the present invention.

FIG. 8 illustrates a signal transmission method for traffic distribution when a backhaul link between two eNBs is ideal according to an embodiment of the present invention.

Referring to FIG. 8, in step 801, eNB 2 transmits data, which will be transmitted to a destination UE, to eNB 1 through an ideal backhaul link.

Thereafter, the eNB 1 transmits the data to be transmitted to the destination UE to relay UEs, i.e., TxUE1 and TxUE2 in step 802. In this case, it is preferred that the eNB 1 transmits the data to be transmitted to the destination UE to the relay UEs through a PDSCH in a multicast manner. In addition, a relay UE can be determined by a network in a semi-static manner and the relay UE needs to relay received DL data instead of considering the DL data as its own data. Alternatively, the eNB 1 can dynamically inform the relay UE of whether currently transmitted data is for the relay UE or to be transmitted to the destination UE, through downlink control information (DCI).

The relay UEs relay the data to the destination UE in step 803 and the destination UE provides A/N feedback in response to the received data to the eNB 2 in step S804. The steps 803 and 804 will be described in detail with reference to FIG. 9.

Figure 9:
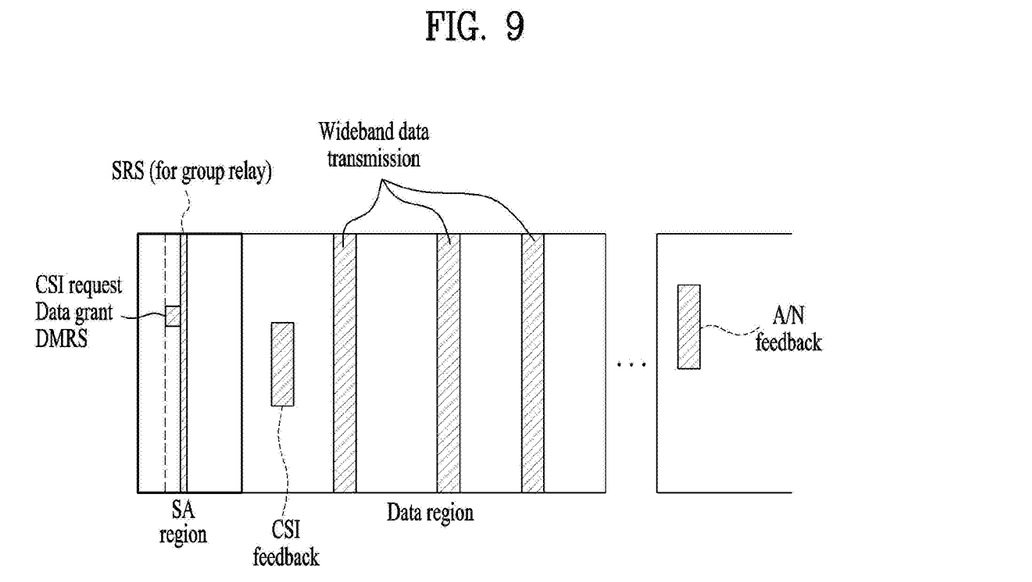
FIG. 9 is a diagram for explaining a signal transmission and reception procedure between a relay UE and a destination UE when a backhaul link between two eNBs is ideal according to an embodiment of the present invention.

FIG. 9 is a diagram for explaining a signal transmission and reception procedure between a relay UE and a destination UE when a backhaul link between two eNBs is ideal according to an embodiment of the present invention.

Referring to FIG. 9, a relay UE transmits scheduling information and control information to a destination UE to transmit data to the destination UE. Hereinbelow, the scheduling information and control information is referred to as scheduling assignment (SA). The SA transmission carries a data grant for data transmission, a CSI feedback request, and a UE-specific reference signal for enabling a destination UE to receive such information through channel estimation, e.g., a DM-RS.

In addition, when there are a plurality of relay UEs, that is, TxUE1 and TxUE2 as shown in FIG. 8, the TxUE1 and TxUE2 perform cooperative space-frequency block coding (SFBC) to improve transmission reliability of the SA transmission. In other words, the TxUE1 and TxUE2 use different DM-RS antenna ports and perform SFBC-based transmission using the antenna ports together. FIG. 9 shows that the SA transmission is performed in an SA region, which is configured in a semi-static manner.

After receiving the SA, the destination UE calculates optimal CSI in consideration channels with the relay UEs and then feedbacks the calculated optimal CSI. Since the relay UEs cooperatively perform joint transmission (JT), the destination UE estimates a channel based on a reference signal from each relay UE and then generates a composite channel by combining the estimated channels. Thereafter, the destination UE calculates CSI that can be achieved through the composite channel according to a transmission scheme. If the transmission scheme is open-loop MIMO, the destination UE may feedback only an RI and a CQI without a PMI. On the other hand, if the transmission scheme is closed-loop MIMO, the destination UE may feedback the RI and the CQI along with an optimal PMI within a codebook.

As a reference signal used for CSI feedback, a DM-RS included in the SA transmission or an SRS included in the SA region over a wideband may be used. In case of DM-RS based CSI, since a DM-RS exists only in a specific RB where the SA is transmitted, the CSI can be calculated based on the specific RB only. In this case, if the relay UEs perform transmission over a full band using the above-mentioned CSI, it may cause performance degradation because the CSI may be different from CSI with respect to the full band. On the other, in case of SRS-based CSI, the CSI may be calculated with respect to a full-band channel according to an SRS configuration. In FIG. 9, the TxUE1 and TxUE2 transmits SRSs in the SA region and in this case, both antenna ports of the TxUE1 and antenna ports of the TxUE2 are used for SRS transmission.

The calculated CSI may be reported to the relay UEs using specific resources in a first data region among a plurality of data regions scheduled through a data grant. After receiving the CSI, the relay UEs relay the data to the destination UE by cooperatively performing the open-loop/closed-loop MIMO JT. Considering that the main purpose of the present invention is traffic offloading, data transmission can be performed over the full band on the assumption that the eNB 1 has a small amount of data traffic. That is, the data transmission is performed using multiple data regions, which are scheduled through the SA. When the closed-loop MIMO JT is performed, each of the relay UEs creates a beam by rotating a phase by the PMI with respect to an antenna phase at a time T. Here, the time T means a time at which the relay UE transmits an RS for the CSI feedback in the SA region.

After receiving the data, the destination UE transmits A/N to the eNB 2 through a PUCCH. Even if the eNB 2 receives NACK, retransmission can be instantaneously performed because the backhaul link is ideal. In other words, when the NACK is received, the eNB 2 instructs the eNB 1 to retransmit the corresponding data and the eNB 1 performs the retransmission using the relay UEs. It is preferred that resource for A/N feedback is predetermined between the eNB 2 and the UE in order for the eNB 2 to receive A/N information.

Next, a description will be given of a case in which a backhaul link is non-ideal. When a backhaul link between two cells is non-ideal, a time required for eNBs to share information therebetween is relatively large and thus, the cells cannot perform cooperation dynamically. In this case, it is efficient that the relay UE, which relays the data to the RxUE, performs HARQ processing instead of the eNB 2.

Figure 10:
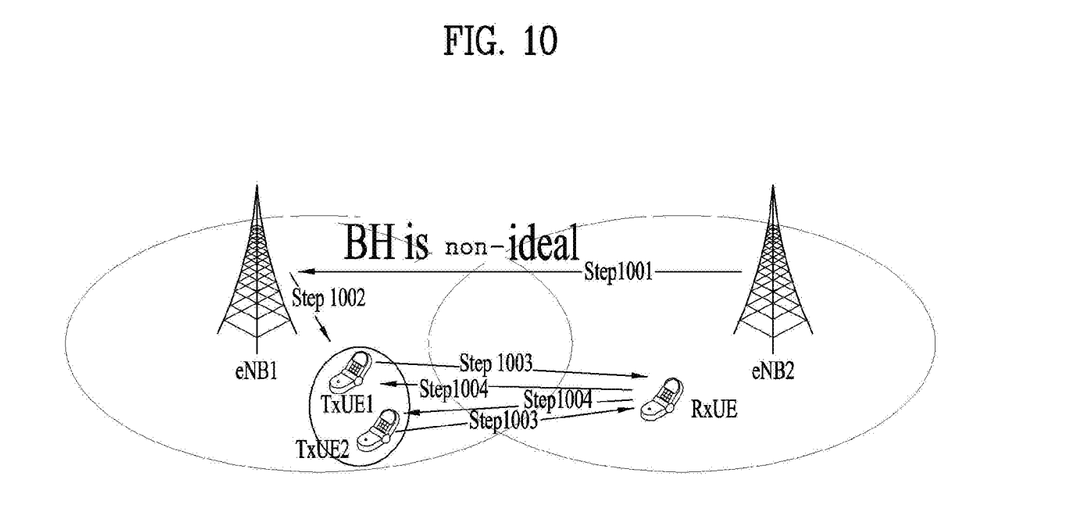
FIG. 10 illustrates a signal transmission method for traffic distribution when a backhaul link between two eNBs is non-ideal according to an embodiment of the present invention.

FIG. 10 illustrates a signal transmission method for traffic distribution when a backhaul link between two eNBs is non-ideal according to an embodiment of the present invention. In particular, unlike FIG. 8, FIG. 10 shows that the last communication link of step 1004 is connected to TxUE1 and TxUE2 and thus, a relay UE performs HARQ processing.

Referring to FIG. 10, eNB 2 transmits data to be transmitted to a destination UE to eNB 1 through a non-ideal backhaul link in step 1001.

Thereafter, the eNB 1 transmits the data to be transmitted to the destination UE to relay UEs, i.e., the TxUE1 and TxUE2 in step S1002. Similar to the ideal backhaul link, it is preferred that the eNB 1 transmits the data to be transmitted to the destination UE to the relay UEs through a PDSCH in a multicast manner.

The relay UEs relay the data to the destination UE in step 1003 and the destination UE provides A/N feedback in response to the received data to the relay UEs in step 1004. Details will be described with reference to FIG. 11.

Figure 11:
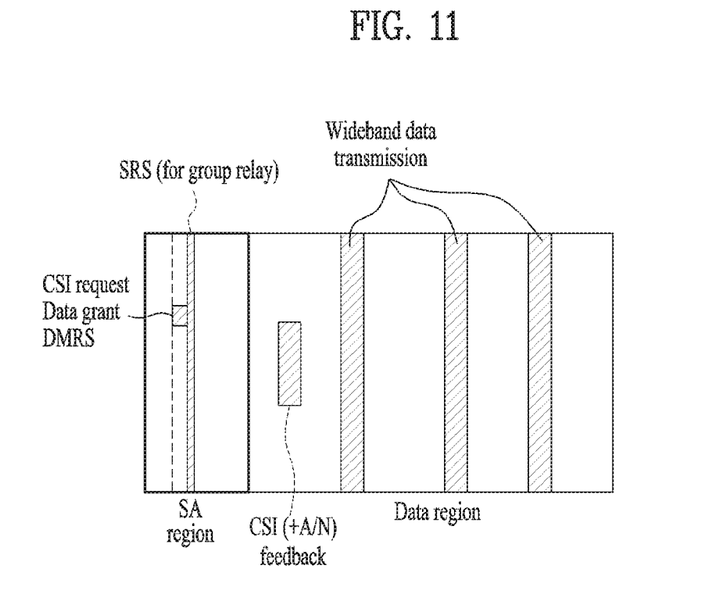
FIG. 11 is a diagram for explaining a signal transmission and reception procedure between a relay UE and a destination UE when a backhaul link between two eNBs is non-ideal according to an embodiment of the present invention.

FIG. 11 is a diagram for explaining a signal transmission and reception procedure between a relay UE and a destination UE when a backhaul link between two eNBs is non-ideal according to an embodiment of the present invention.

Referring to FIG. 11, a destination UE transmits A/N feedback in each first data region after receiving SA. In this case, A/N may mean A/N in response to all received data after transmission of previous A/N, that is, A/N for individual transport blocks (TBs). In other words, when the destination UE receives N TBs after transmitting the previous A/N, the destination UE gather N pieces of A/N and then perform feedback. The A/N is reported to relay UEs using specific resources in a first data region among a plurality of data regions scheduled through a data grant. In this case, the A/N and CSI feedback may be transmitted in the same subframe as shown in FIG. 11.

When TxUE1 and TxUE2 receive ACK with respect to a specific TB, the TxUE1 and TxUE2 remove the corresponding TB in a data buffer and then do not retransmit the corresponding data any more. On the contrary, when receiving NACK, the TxUE1 and TxUE2 retransmits the TB stored in the data buffer through a data region. The TB retransmission is performed using a lowest time frequency resource selected from among a plurality of data regions allocated through the SA and new transmission is performed using the remaining data regions. For example, if subframes n, (n+10), (n+20), (n+30), and (n+40) are designated as a data region, retransmission is performed on the subframe n and new transmission is performed on the remaining subframes.

Figure 12:
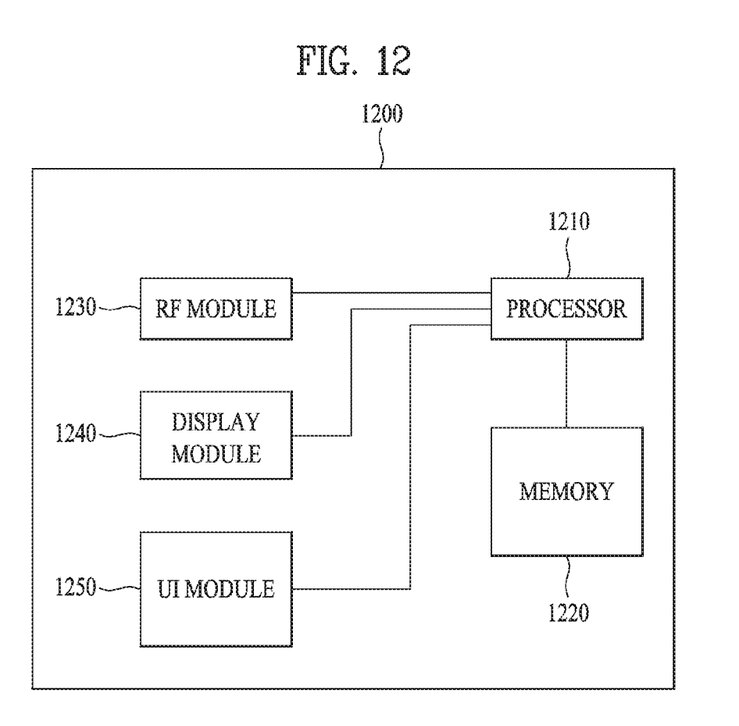
FIG. 12 is a block diagram of a communication apparatus according to an embodiment of the present invention.

FIG. 12 is a block diagram illustrating a communication device according to embodiments of the present invention.

In FIG. 12, the communication device 1200 includes a processor 1210, a memory 1220, a Radio Frequency (RF) module 1230, a display module 1240, and a user interface (UI) module 1250.

The communication device 1200 is disclosed for illustrative purposes only and certain modules may also be omitted from the communication device 1200 as necessary. In addition, the communication device 1200 may further include necessary modules. Some modules of the communication device 1200 may be identified as more detailed modules. The processor 1210 is configured to carry out the operations of the embodiments of the present invention. For detailed operations of the processor 1210 reference may be made to FIGS. 1 to 11.

The memory 1220 is connected to the processor 1210, and stores an operating system, applications, program code, data and the like. The RF module 1230 is connected to the processor 1210 and converts a baseband signal into a radio frequency (RF) signal, or converts the RF signal into the baseband signal. For these operations, the RF module 1230 performs analog conversion, amplification, filtering, and frequency up-conversion in order or performs such operations in reverse order. The display module 1240 is connected to the processor 1210 and displays a variety of information. The scope or spirit of the display module 1240 of the present invention is not limited thereto, and the display module 1240 may be any of well-known elements, for example, a Liquid Crystal Display (LCD), a Light Emitting Diode (LED), an Organic Light Emitting Diode (OLED) and the like. The user interface (UI) module 1250 is connected to the processor 1210, and may be implemented as a combination of user interfaces such as a keypad, a touchscreen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

Although a network cooperative communication method for traffic distribution in a wireless communication system and apparatus therefor are mainly described with reference to examples applied to the 3GPP LTE system, the method and apparatus can be applied to various kinds of wireless communication systems as well as the 3GPP LTE system.

What is claimed is:

1. A method of transmitting downlink data for a reception user equipment (UE) of a first cell by a relay user equipment (UE) of a second cell in a wireless communication system, the method performed by the relay UE and comprising:
   receiving, from the second cell, first control information and downlink data, wherein the first control information indicates whether the downlink data is for the reception UE of the first cell or not;
   determining that the downlink data is for the reception UE of the first cell;
   transmitting, to the reception UE, second control information for the downlink data, wherein the second control information includes a data grant indicating a plurality of resource regions for communication between the relay UE and the reception UE and a message requesting channel state information between the relay UE and the reception UE, wherein the plurality of resource regions for communication between the relay UE and the reception UE are uplink resource regions for communication from the relay UE to the second cell;
   receiving, from the reception UE, the channel state information through a first resource region among the plurality of resource regions;
   precoding the downlink data based on the channel state information;
   transmitting, to the reception UE, the precoded downlink data through the plurality of resource regions except for the first resource region;
   receiving, from the reception UE, a response signal in response to the precoded downlink data;
   determining that the response signal indicates a reception failure of the precoded downlink data by the reception UE; and
   in response to determining that the response signal indicates the reception failure of the precoded downlink data, re-transmitting, to the reception UE, the precoded downlink data using a resource region having a lowest index among the plurality of resource regions,
   wherein the downlink data is transferred from the first cell to the second cell through a backhaul link.

2. The method of claim 1, further comprising transmitting a sounding reference signal to the reception UE, wherein the channel state information between the relay UE and the reception UE is calculated by the reception UE based on the sounding reference signal.

3. The method of claim 1, further comprising receiving a response signal in response to the downlink data from the reception UE.

* * * * *